(12) United States Patent
Lehmann et al.

(10) Patent No.: US 7,686,404 B2
(45) Date of Patent: Mar. 30, 2010

(54) ELECTRO-HYDRAULIC BRAKING SYSTEM

(75) Inventors: Kurt Stouffer Lehmann, Clarkston, MI (US); Robert Charles Beaver, Lake Orion, MI (US); David Leslie Agnew, Clarkston, MI (US); Kent Randolph Young, Grand Blanc, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 187 days.

(21) Appl. No.: 11/063,946

(22) Filed: Feb. 23, 2005

(65) Prior Publication Data

US 2006/0186729 A1 Aug. 24, 2006

(51) Int. Cl.
*B60T 8/34* (2006.01)

(52) U.S. Cl. .................................................. 303/114.3

(58) Field of Classification Search ................... 303/11, 303/113.4, 114.3, 114.1, 114.2
See application file for complete search history.

(56) References Cited

U.S. PATENT DOCUMENTS

| | | | |
|---|---|---|---|
| 4,199,948 A * | 4/1980 | Mathues et al. ............... | 60/553 |
| 4,354,716 A * | 10/1982 | Burgdorf ................. | 303/113.4 |
| 4,662,687 A * | 5/1987 | Leiber ..................... | 303/113.3 |
| 5,531,509 A * | 7/1996 | Kellner et al. ............. | 303/114.1 |
| 5,586,814 A * | 12/1996 | Steiner ..................... | 303/116.2 |
| 5,607,209 A * | 3/1997 | Narita et al. ........... | 303/122.11 |
| 5,742,918 A | 4/1998 | Ashrafi et al. | |
| 5,809,434 A | 9/1998 | Ashrafi et al. | |
| 5,938,297 A * | 8/1999 | Whaite et al. ............. | 303/114.3 |
| 5,941,609 A * | 8/1999 | Wagner et al. ........... | 303/114.3 |
| 5,954,406 A * | 9/1999 | Sawada .................. | 303/122.09 |
| 5,967,628 A * | 10/1999 | Abe et al. .............. | 303/122.12 |
| 6,019,438 A * | 2/2000 | Sawada et al. ........... | 303/113.4 |
| 6,033,038 A * | 3/2000 | Kulkarni et al. .......... | 303/114.3 |
| 6,062,656 A | 5/2000 | Unterforsthuber et al. | |
| 6,122,568 A | 9/2000 | Madau et al. | |
| 6,289,271 B1 * | 9/2001 | Isono et al. .................... | 701/31 |
| 6,318,815 B1 * | 11/2001 | Haupt et al. ............. | 303/113.4 |
| 6,715,846 B1 * | 4/2004 | Pueschel et al. .......... | 303/114.3 |

FOREIGN PATENT DOCUMENTS

WO  WO 02/098718 A1  12/2002

* cited by examiner

*Primary Examiner*—Xuan Lan Nguyen
(74) *Attorney, Agent, or Firm*—Brinks Hofer Gilson & Lione

(57) ABSTRACT

A hydraulic brake system for a motor vehicle supplies pressurized brake fluid to a wheel brake in response to a demand signal. The brake system includes a master cylinder in fluid communication with the wheel brake to control the actuation thereof. Furthermore, actuation of the master cylinder is controlled and/or amplified by first and second pressure-amplifying mechanisms, which are electrically controlled by an electrical control unit.

16 Claims, 3 Drawing Sheets

ELECTRO-HYDRAULIC BRAKING SYSTEM

FIELD OF THE INVENTION

The invention relates to vehicle hydraulic braking systems in which a driver demand signal for vehicle wheel brake actuation, such as an applied brake pedal force, is power-assisted to achieve wheel brake damping forces that are of a sufficient magnitude to retard rotational movement of the road wheels.

BACKGROUND OF THE INVENTION

In a conventional power-assisted vehicle braking system for passenger cars and light trucks, an operator depresses a brake pedal to progressively actuate a master hydraulic brake cylinder that is mechanically coupled to the brake pedal. The applied pedal force is amplified or "power assisted" by either a vacuum booster or a hydraulic booster coupled to the master cylinder, whereupon the master brake cylinder builds up a correlative amount of pressure in the brake lines to actuate the wheel brakes of the vehicle. More specifically, the pressurized fluid causes brake pads to press against a rotor or brake shoes against a drum coupled with the wheel, thereby retarding rotation of the wheel. In this manner, such conventional power-assisted vehicle braking systems achieve a wheel brake damping force sufficient to decelerate the vehicle.

Many vehicles are also equipped with electronically-assisted "active braking" systems, or electronic braking systems "EBS", in which the supply of pressurized fluid to each individual wheel brake is also moderated under a microprocessor control to prevent wheel lockup (in so-called anti-locking braking systems or ABS) and undesirable wheel slip (in so-called automatic slip control or ASR). Other variations and embodiments of such systems are: traction control systems (TCS), electronic stability programs (ESP), and active rollover protection (ARP). These active braking systems typically include wheel speed sensors to identify the wheel lockup and wheel slip. Additionally, solenoid-operated regulating valves selectively control the supply to and release of pressurized fluid to the brake cylinder of each wheel. Furthermore, these systems typically include a motor-driven pump, disposed on the "back" or supply side of the power-assisted master cylinder, which is capable of providing additional hydraulic fluid pressure and volume to the wheel cylinders during ABS operation.

In another known system, the brake pedal is connected to and triggers the activation of an active booster. Under a first set of operating conditions, such as when relatively small forces are applied to the brake pedal, the force applied to the brake pedal is generally proportional to the force applied to the master cylinder. However, under a second set of operating conditions, such as when relatively large forces are applied to the brake pedal, the active booster causes the master cylinder to be "boosted" by applying a force onto the master cylinder that is greater than the force applied to the pedal. The active booster includes at least first and second chambers that have lower pressures than the ambient during the first set of operating conditions. The first and second chambers are separated by a movable diaphragm that is connected to the master cylinder. Once the brake pedal has traveled a predetermined distance such that the second set of operating conditions occur, the first chamber is filled with ambient air, thereby applying a force to the diaphragm and to the master cylinder that is greater than the force applied to the brake pedal.

However, the system described above may not be fully operational during a mechanical failure, such as a vacuum failure, causing the system to have a low response time to system changes or failures. Additionally, the above-described system may not be quickly responsive to other system changes, such as a change in operating conditions. Furthermore, the above-described system may not meet Federal requirements for resulting deceleration in response to a given applied muscle force, or the system may require undesirably expensive and/or bulky components to comply therewith.

Therefore, it is desirous to provide a system that includes secondary, backup system controls that are quickly and fully responsive to system changes and/or system failures.

SUMMARY OF THE INVENTION

A hydraulic brake system for a motor vehicle is provided in accordance with the present invention. The brake system supplies pressurized brake fluid to a wheel brake in response to a demand signal, thereby retarding rotational movement of a road wheel coupled with the wheel brake. The brake system includes a master cylinder in fluid communication with the wheel brake to control the actuation of the wheel brake. More specifically, the master cylinder applies a varying force to the brake fluid to control the timing and the magnitude of the brake actuation. The force applied to the master cylinder is controlled by a first pressure-amplifying mechanism, in response to a first electrical output signal that is based on the demand signal. The wheel brakes are further controlled by a second pressure-amplifying mechanism that controls the pressure of the pressurized brake fluid in response to a second electrical output signal that is based on the demand signal. Therefore, the brake system includes a mode of operation where input from the demand signal is converted into the first and second electrical signals to electrically control the pressure-amplifying mechanisms.

The first pressure-amplifying mechanism is preferably an active booster located upstream of the master cylinder that converts the first electrical signal into a mechanical force acting on a diaphragm. The diaphragm, which is mechanically coupled with the master cylinder, transfers the force to a piston in the master cylinder and actuates the wheel brakes. The second pressure-amplifying mechanism is preferably a hydraulic pump that applies a force onto the pressurized brake fluid in the direction of the wheel brake such as to further actuate the wheel brakes.

In one aspect of the present invention, the first and second pressure-amplifying mechanisms are controlled by an electronic control unit during one brake system operational mode. More specifically, the electronic control unit provides the first electrical output signal to the first pressure-amplifying mechanism and provides the second electrical output signal to the second pressure-amplifying mechanism. The electrical control unit preferably receives inputs from the muscle force depressing the pedal and from other various sensors of the system. More specifically, a first pressure sensor is located downstream of the master cylinder to provide the electrical control unit with data regarding the performance of the active booster and the master cylinder. Additionally, a second pressure sensor is located downstream of the hydraulic pump to provide the electrical control unit with data regarding the performance of the hydraulic pump. Furthermore, a wheel rotational speed sensor is located adjacent to each of the road wheel to provide the electrical control unit with data regarding the performance of the wheel brake. The electrical control unit, in response to these inputs, electrically controls the actuation of the active booster and the displacement of the hydraulic pump.

In another aspect of the invention, the first pressure-amplifying mechanism is controlled by a mechanical control unit during another brake system operational mode. The mechanical control unit is a back-up control unit that translates a mechanical signal from the brake pedal to the active booster to increase the pressure of the pressurized brake fluid if the pressure-amplifying mechanisms fail to increase the pressure of the pressurized brake fluid in correlation with the electrical signal. In other words, if the electrical control unit fails to effectively cause the actuation of the active booster, the mechanical control unit may do so. The mechanical control unit includes a push rod that contacts and actuates a diaphragm within the active booster, thereby actuating the master cylinder and the wheel brakes. The push rod preferably is spaced a distance from the diaphragm when the active booster is effectively electrically actuated by the electrical control unit. More specifically, the electrical signal causes the diaphragm to move in unison with the push rod such that the diaphragm and the push rod are prevented from abutting each other while the first pressure-amplifying mechanism is increasing the pressure of the pressurized brake fluid in correlation with the first electrical output signal. However, when the first pressure-amplifying mechanism fails to do so, the push rod engages the diaphragm, or an activation means thereof, thereby activating the master cylinder and the wheel brakes.

In another aspect of the present invention, a pedal feel simulator is coupled with the brake pedal to simulate a desired feel for the vehicle operator. More specifically, the simulator receives the demand signal from the brake pedal and generates a reaction force acting on the brake pedal. The reaction force may be similar to a naturally-occurring reaction force that a user would feel during braking, such as the naturally-occurring resistance force generated by normal forces between the pedal and the master cylinder. Alternatively, the reaction force may be a force that is not normally-occurring that would prompt the driver to perform a desired response, such as during anti-lock braking activation. More specifically, during normal anti-lock brake activation, the vehicle operator feels the brake pedal forced back towards the unactuated position, possibly causing the operator to undesirably release the brake pedal. However, in the present invention, the pedal feel simulator is able to avoid any potentially undesirable, naturally-occurring forces acting on the brake pedal. The brake pedal and the first pressure-amplifying mechanism preferably do not mechanically engage each other during normal operation of the brake system to permit the pedal feel simulator to generate the above-described non-naturally-occurring forces.

In another aspect of the present invention, the brake system utilizes some or all of the above-described components to achieve higher brake fluid pressures and higher wheel brakes actuating forces than those possible with currently known systems. As a result, the components of the brake system, such as the master cylinder pistons, the wheel brake cylinders, and the active booster chambers may be able to be reduced in size and weight. Furthermore, Federal safety guidelines regarding minimum vehicle deceleration generated by muscle forces may be able to be more easily met.

Additional features, benefits, and advantages of the invention will become apparent to those skilled in the art to which the invention relates from the subsequent description of several exemplary embodiments and the appended claims, taken in conjunction with the accompanying Drawings.

BRIEF DESCRIPTION OF THE DRAWINGS

Referring to the Drawings, wherein like reference numerals are used to designate like components within each of the several views.

DETAILED DESCRIPTION OF THE INVENTION

Figure 1:
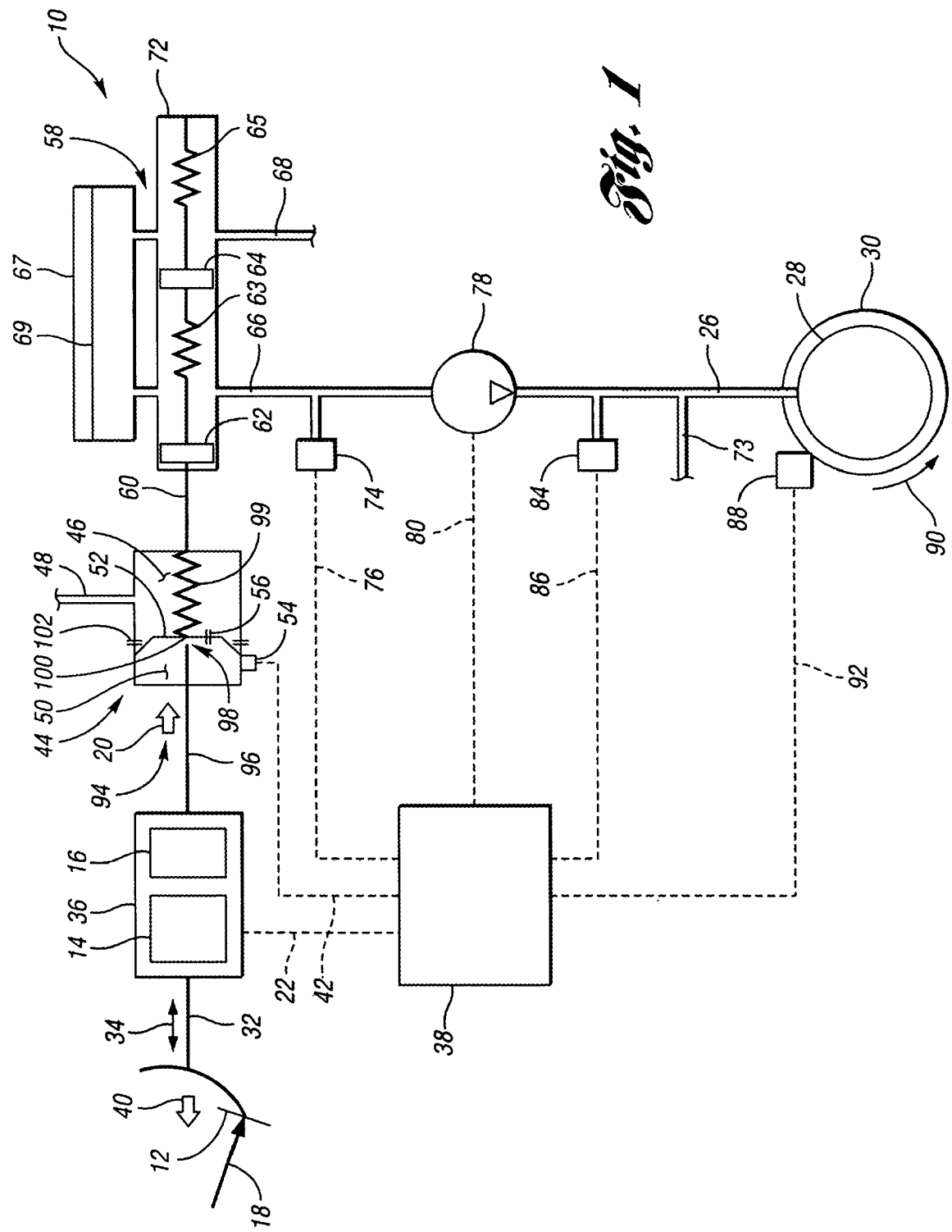
FIG. 1 is a schematic view of a hydraulic brake system embodying the principles of the present invention, the brake system having a vacuum-powered active booster and a hydraulic pump that are each controlled by an electronic control unit.

Referring now to the drawings, a hydraulic brake system 10 for a motor vehicle is illustrated diagrammatically as including a brake pedal 12 coupled to a pedal travel sensor 14 and/or a pedal force sensor 16 responsive to a drivers muscular force 18 from the brake pedal 12 that convert the muscular force 18 into a suitable demand signal, such as a mechanical signal 20 or an electrical signal 22. The mechanical signal 20 and/or the electrical signal 22 are then utilized to control the pressure of a pressurized brake fluid 26, thereby controlling respective wheel brakes 28 that are coupled with road wheels 30 to retard the rotational movement thereof as desired. Typically, during normal operation of the hydraulic brake system 10, the wheel brakes 28 are connected to the brake pedal by the electrical signal 22, rather than by a mechanical connection. However, as will be discussed in more detail below, the mechanical signal 20 may be a selectively-activated mechanical engagement between the brake pedal 12 and the wheel brakes 28 when the connection by the electrical signal 22 is less than completely effective. Therefore, the depression of the brake pedal 12 causes the electrical signal 22 and or the mechanical signal 20 to cause the motor vehicle to decelerate.

A push rod 32 is connected to the brake pedal 12 and undergoes generally linear movement in a direction indicated by reference numeral 34 in response to the depression of the brake pedal 12. The push rod 32 extends from the passenger compartment into a pedal feel simulator 36, which may be located within the engine compartment of the motor vehicle. The pedal feel simulator 36 houses the pedal travel sensor 14 and the pedal force sensor 16, which respectively measure the linear travel of the brake pedal 12 and the force with which it does so. Alternatively, the brake pedal 12 itself includes force, travel, and/or velocity sensors that are electrically communicated to the pedal feel simulator 36. In this design, the brake pedal 12 need not be designed to undergo any transverse movement.

The pedal feel simulator 36 then generates and sends the electrical signal 22, which contains information from the respective sensors 14, 16, to an electronic, primary control unit (hereafter known as the electrical control unit 38 "ECU"), as will be discussed in more detail below. Because the brake pedal 12 and the wheel brakes 28 are not typically mechanical coupled with each other, the pedal feel simulator 36 simulates a reactionary force 40 that is designed to generate a desired feel for the driver. More specifically, at times the pedal feel simulator 36 will apply resistance to the operator's depressing motion, and at other times the pedal feel simulator 36 will offer little or no resistance, based on the magnitudes of the linear displacement and the force of the brake pedal 12. For example, the reaction force may be similar to a naturally-occurring reaction force that a user would feel during braking, such as the naturally-occurring resistance force generated by forces between the pedal and the master cylinder. Alternatively, the reaction force may be a force that is not normally-occurring in order to prompt the driver to perform a desired response, as discussed above in the Summary.

The pedal feel simulator may contain a velocity sensor that measures the instantaneous velocity with which the brake pedal 12 travels. The information gathered by the velocity sensor is then used to determine the reactionary force 40 and is provided to the ECU 38 along the electrical signal 22. The ECU 38 receives the electrical signal 22 as an input signal and generates a first electrical output signal 42 for communication with a first pressure-amplifying mechanism to increase the pressure of the pressurized brake fluid 26. The first pressure-amplifying mechanism shown in the Figures is a vacuum-powered active booster 44, but any appropriate mechanism for increasing the pressure of the pressurized brake fluid 26 may be used.

The active booster 44 includes a vacuum chamber 46 fluidly connected to the vehicle engine via a vacuum conduit 48, causing the vacuum chamber 46 to have a pressure significantly lower than atmospheric pressure. The active booster 44 also includes a variable chamber 50 that is separated from the vacuum chamber 46 by a movable diaphragm 52 and an electrically-controlled valve 54 that separates the variable chamber 50 from the ambient air. A one-way valve 56 is preferably located within the diaphragm 52 to allow air to flow, in a tempered airflow, from the variable chamber 50 into the vacuum chamber 46. Therefore, when the electrically-controlled valve 54 is dosed, the respective chambers 46, 50 both include a pressure that is significantly lower than that of the ambient air. When the electrically-controlled valve 54 is opened, however, a high airflow of ambient air enters the variable chamber 50 at a higher flowrate than the one way valve 56 will permit to flow therethrough, creating a force on the diaphragm 52 that compresses the volume of the vacuum chamber 46. Therefore, the electrically-controlled valve 54 controls the displacement of and/or the force applied to the diaphragm 52, thereby controlling the wheel brakes 28, as will be discussed in further detail below.

The electrically-controlled valve 54 is controlled by the first electrical output signal 42. More specifically, the ECU 38 analyzes the electrical signal 22 and other inputs from the hydraulic brake system 10, which will be discussed in more detail below, to determine whether and to what extent the force should be applied to the diaphragm 52. Once the desired timing and magnitude of the force are determined, the ECU 38 sends the corresponding first electrical output signal 42 to the electrically-controlled valve 54 and the force occurs as described above.

In a first example of the operation of the ECU 38, if the driver gently depresses the brake pedal 12 over a relatively short distance, then the force applied to the diaphragm 52 by the ECU 38 may be generally equal to the muscular force 18 applied to the brake pedal 12. Thus, the ECU 38 will send the first electrical output signal 42 to the electrically-controlled valve 54 and cause the force acting on the diaphragm 52 to be generally proportional to the muscular force 18 applied to the brake pedal 12. More specifically, as discussed above, the muscular force 18 may be multiplied by a pedal ratio. However, in a second example, if the driver depresses the brake pedal 12 along relatively large distance and/or with a relatively large force, then the ECU 38 may determine that a "boost" is necessary and that the force applied to the diaphragm 52 should be relatively greater than the muscular force 18 applied to the brake pedal 12. The boost effect permits the vehicle operator to decelerate the vehicle at a high rate with a relatively low muscular force 18, thereby improving the braking time of the vehicle. Thus, in this second example, the ECU 38 will send the first electrical output signal 42 to the electrically-controlled valve 54 and apply a force onto the diaphragm 52 that is greater than the muscular force 18 applied to the brake pedal 12.

The ECU 38 in the hydraulic brake system 10 typically does not cause the electrically-controlled valve 54 to generate the force acting the diaphragm 52 to be less than that of the muscular force 18 on the brake pedal 12. However, any suitable increase or decrease in force by the ECU 38 may be performed in conjunction with the present invention. Further, many power braking systems, such as anti-lock braking systems appropriately and regularly decrease the relative force acting on the diaphragm.

When the force is applied to the diaphragm 52, a master cylinder 58 of the hydraulic brake system 10 converts the force into a hydraulic pressure increase in the pressurized hydraulic fluid 26. More specifically, a second push rod 60 is connected to the diaphragm 52 to transfer the force into the push rod 60 and to control fluid flow through the master cylinder 58. The second push rod 60 is also connected to a pair of pistons 62, 64 that are disposed within a hydraulic chamber 72. The pistons 62, 64 are connected to a pair of springs 63, 65 to urge the pistons 62, 64 towards the active booster 44 and to cause the pistons 62, 64 to move in unison with each other. Therefore, the springs 63, 65 are preferably generally equal in stiffness and length. A spring 100 also functions to bias the diaphragm 52 back towards its natural state, which is shown in FIG. 1, when the brake pedal 12 is released by the driver. The hydraulic chamber 72 includes a reservoir 67 containing brake fluid 69 to ensure that the pistons 62, 64 have enough brake fluid to displace.

As the pistons 62, 64 are urged away from the active booster 44, they force brake fluid through a pair of conduits 66, 68 at an increased pressure. More specifically, the pistons 62, 64 each form generally fluid-tight seals with the hydraulic chamber 72, thereby displacing brake fluid and increasing the pressure of the pressurized brake fluid 26 as they are biased away from the active booster 44. The conduits 66, 68 each lead to respective wheel brakes 28 that are coupled with the respective road wheels 30 such that increasing the pressure increases the braking force applied to the respective road wheels 30. The hydraulic brake system 10 shown in FIG. 1 discloses the first conduit 66 being connected to one of the respective road wheels 30, such as a front left wheel, a second branch 73 that is fluidly connected to the first conduit and is connected to a second road wheel (not shown), such as a rear right wheel. Further, the hydraulic brake system 10 shown in FIG. 1 discloses the second conduit 68 being connected to a second pair of road wheels (not shown), such as a front right wheel and a rear left wheel. However, any suitable configuration may be used. The conduits may be connected to road wheels that have different braking mechanisms, such as disc brakes and drum brakes that require different fluid pressures for actuation thereof. Therefore, the respective pressures in the respective conduits may not be equal to each other during brake actuation.

A first pressure sensor 74 is fluidly coupled with the first conduit 66 downstream of the master cylinder 58 to measure and communicate to the ECU 38 the pressure of the pressurized brake fluid 26 exiting the master cylinder 58. More specifically, the first pressure sensor 74 generates a first input signal 76 and electronically communicates the first input signal 76 to the ECU 38. The ECU 38 analyzes the first input signal 76 to determine the combined effectiveness of the active booster 44 and the master cylinder 58 and to determine whether the active booster 44 should be further amplified and/or whether a second pressure-amplifying mechanism should be used.

The second pressure-amplifying mechanism shown in FIG. 1 is a hydraulic pump 78 that urges the pressurized brake fluid 26 towards the respective wheel brakes 28. The hydraulic pump 78 is electrically-controlled by the ECU 38 by providing a second electrical output signal 80 to the hydraulic pump 78. The second electrical output signal 80 is able to control the magnitude of pressurized brake fluid 26 urged towards the wheel brake 30, thereby being able to further increase the pressure of the pressurized brake fluid 26.

A second pressure sensor 84 is fluidly coupled with the first conduit 66 downstream of the master cylinder hydraulic pump 78 to measure and communicate to the ECU 38 the pressure of the pressurized brake fluid 26 exiting the hydraulic pump 78. More specifically, the second pressure sensor 84 generates a second input signal 86 and electronically communicates the second input signal 86 to the ECU 38. The ECU 38 analyzes the second input signal 86 to determine the effectiveness of the hydraulic pump 78 and to determine whether the active booster 44 and/or the hydraulic pump 78 should be further amplified.

The pressurized brake fluid 26 urged forward by the hydraulic pump 78 then is urged towards the respective wheel brakes 28 to retard the rotation of the respective road wheels 30. A rotational wheel speed sensor 88 is preferably coupled with each of the respective road wheels 30 to measure the rotational wheel speed 90. The rotational wheel speed sensor 88 also electronically communicates the rotational wheel speed 90 to the ECU 38 via a third input signal 92. The ECU 38 analyzes the third input signal 92 to determine the effectiveness of the respective wheel brakes 28 and to determine whether the active booster 44 and/or the hydraulic pump 78 should be further amplified. Furthermore, a warning light may be activated by the ECU 38 to alert the driver that the respective wheel brakes 28 are less than fully-effective.

Figure 2:
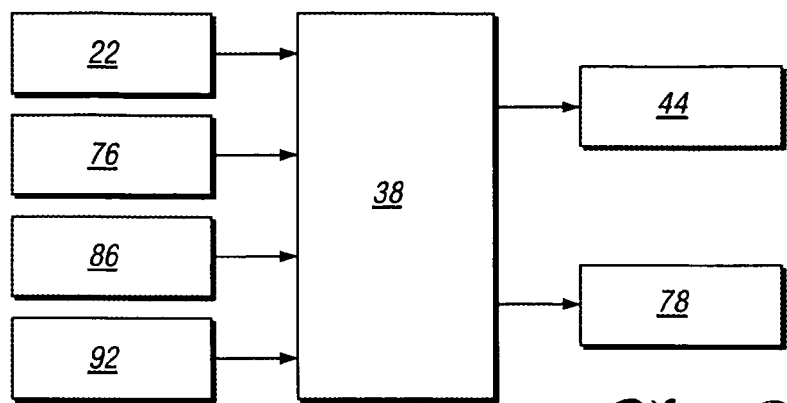
FIG. 2 is a block diagram indicating an electrical control of the brake system shown in FIG. 1.

Referring now to FIG. 2, the logic of the ECU 38 will now be summarized. The ECU 38 shown in the Figures receives four inputs (the electrical signal 22, the first input signal 76, the second input signal 86, and the third input signal 92) that are used to determine the two ECU outputs (the active booster 44 and the hydraulic pump 78). However, alternative suitable designs may be used, such as designs having a varied number of inputs and/or outputs for the ECU 38.

During operation of the hydraulic brake system 10, various components may experience undesirable part wear or failure. Furthermore, some Federal Motor Vehicle Safety Standards (FMVSS) may require one or more backup systems to be present in the hydraulic brake system 10. One such backup is the pair of pressure-actuating mechanisms discussed above, each of which is potentially able to decelerate the vehicle without the assistance of the other, as will be discussed in further detail below. Another such backup includes a secondary control unit that is able to operate at least during one type of failure of the ECU 38.

The secondary control unit is a mechanical control unit 94 (hereafter known as the "MCU") that is able to actuate the active booster 44 without an electrical signal; thereby allowing the MCU 94 to control the active booster 44 during a system power failure and during vacuum failure. The MCU 94 includes a gap push rod 96 that mechanically activates the diaphragm 52 if the electrically-controlled valve 54 fails to do so. More specifically, the gap push rod 96 is coupled with or integrally formed with the push rod 32 such that the respective components 32, 96 move in unison with each other. The gap push rod 96 extends from the pedal feel simulator 36 towards the diaphragm 52 such as to be spaced apart by a gap distance 98 from an engaging means when the brake pedal 12 is not depressed. The engaging means is any suitable mechanism that activates movement of the diaphragm 52 via a mechanical engagement with the gap push rod 96. In the Figures, the engagement means is a contact surface 100 of the diaphragm 52 that is selectively engaged by the gap push rod 96 to cause displacement of the diaphragm.

For example, when the brake pedal 12 is depressed the gap push rod 96 moves towards the contact surface 100 as if to decrease the gap distance 98 therebetween. However, during normal operating conditions, such as when the active booster 44 is effectively controlled and properly working, the diaphragm 52 is activated by the electrically-controlled valve 54 and moves away from or in unison with the gap push rod 96, thereby preventing the respective components 52, 96 from contacting each other. Therefore, the diaphragm 52 and the gap push rod 96 typically do not engage each other during normal operation of the hydraulic brake system 10. However, when the diaphragm 52 fails to be displaced by the electrically-controlled valve 54, such as during a power failure, the gap distance 98 becomes smaller as the gap push rod 96 moves towards and abuts the diaphragm 52. This abutment moves the diaphragm 52 towards the master cylinder 58, thereby actuating the second push rod 60 and the master cylinder pistons 62, 64. The springs 63, 65 urge the diaphragm 52 to its natural state when the brake pedal 12 is released.

In another embodiment, the engagement means is a valve (not shown) similar to the electrically-controlled valve 54 that is directly engaged by the gap push rod 96 to cause displacement of the diaphragm 52. More specifically, the more the gap push rod is displaced, the more the valve is opened and the more the diaphragm 52 is displaced.

The MCU 94 also may include a mechanically-controlled valve 102 that boosts the travel of the diaphragm 52. More specifically, as the diaphragm 52 has traveled a predetermined distance towards the master cylinder 58, the mechanically-controlled valve 102 is uncovered and permits ambient air to flow into to the variable chamber 50, thereby causing the diaphragm 52 to move forward. The springs 63, 65 urge the diaphragm 52 to its natural state when the brake pedal 12 is released.

Figure 3:
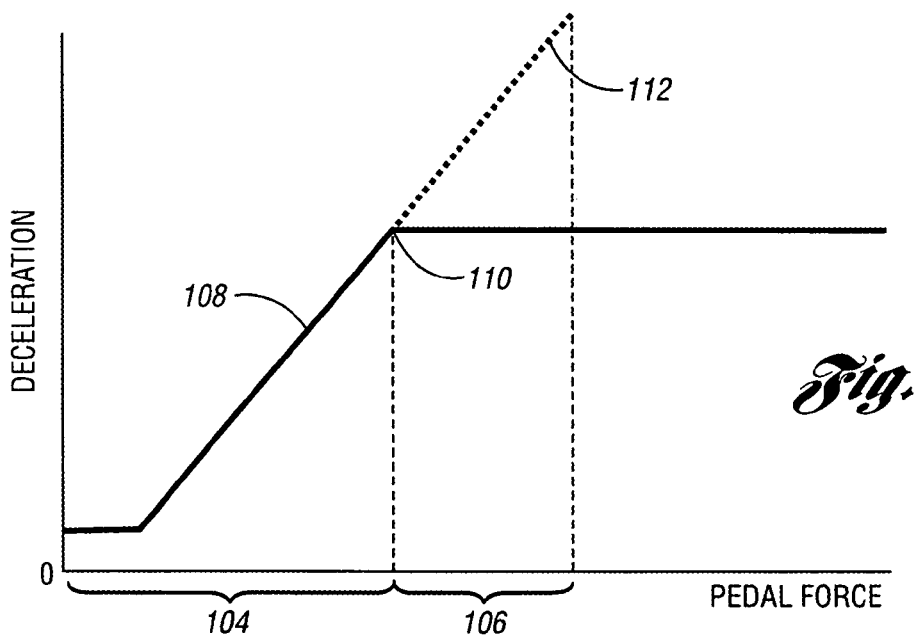
FIG. 3 is a graphical representation of a vehicle having the brake system shown in FIG. 1 operating such that the vacuum-powered active booster and the hydraulic pump are operating normally, where the x-axis represents a pedal force applied by the user to the brake system and the y-axis represents the deceleration of the vehicle in response to the pedal force being applied.

Referring now to FIGS. 3-6, various operational modes of the hydraulic brake system 10 will be discussed in more detail. FIG. 3 is a graphical representation of vehicle deceleration as a function of the muscular force 18 acting on the brake pedal 12 during normal system operation. More specifically, the active booster 44 and the hydraulic pump 78 are both fully functional such that the active booster 44 operates solely along a first range 104 of muscular force 18 and the hydraulic pump 78 operates solely or in conjunction with the active booster 44 along a second range 106 of muscular force 18. The active booster 44, operation of which is represented by the solid line generally indicated by reference numeral 108, operates solely until it reaches its point 110 of maximum vacuum force where the force from the ambient air is equal to the oppositely-acting forces from the springs 63, 65. More specifically, at point 110 when the ECU 38 determines that the active booster 44 is no longer causing pressure increases in the pressurized brake fluid 26 based on the readings from the first pressure sensor 74, the hydraulic pump 78 is activated. The hydraulic pump 78, operation of which is represented by the dashed line generally indicated by reference numeral 112, subsequently becomes the primary deceleration-causing component.

Figure 4:
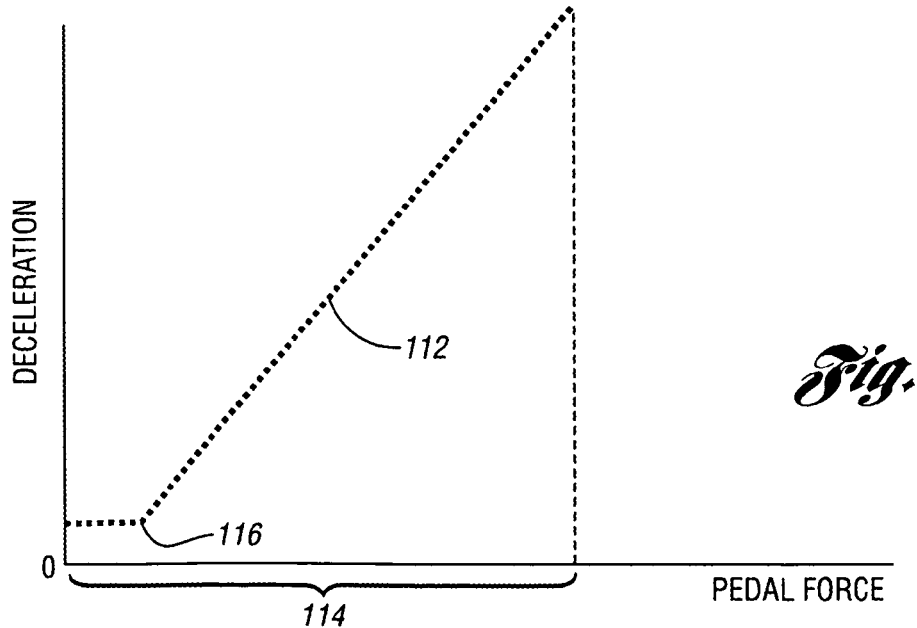
FIG. 4 is a graphical representation similar to FIG. 3, where the brake system is operating such that the vacuum-powered active booster has failed or has been degraded and the hydraulic pump is operating normally.

FIG. 4 is a graphical representation of vehicle deceleration as a function of the muscular force 18 acting on the brake pedal 12 during a first system failure operation. More specifically, the active booster 44 is in failure, or is severely degraded, and the hydraulic pump 78 is fully functional such that the hydraulic pump 78 operates solely along the entire range 114 of muscular force 18. More specifically, at point 116 when the ECU 38 determines that the active booster 44 is not operational based on the readings from the first pressure sensor 74 or from another sensor, the hydraulic pump 78 is activated. The hydraulic pump 78 subsequently becomes the primary deceleration-causing component. The hydraulic pump 78 is activated before the gap push rod 96 abuts the diaphragm 52, so the system is still electrically-operated during this first system failure operation. One set of circumstances that may cause this condition is a failure for a vacuum to form in the vacuum chamber 46 while the system electrical power is still operational.

Figure 5:
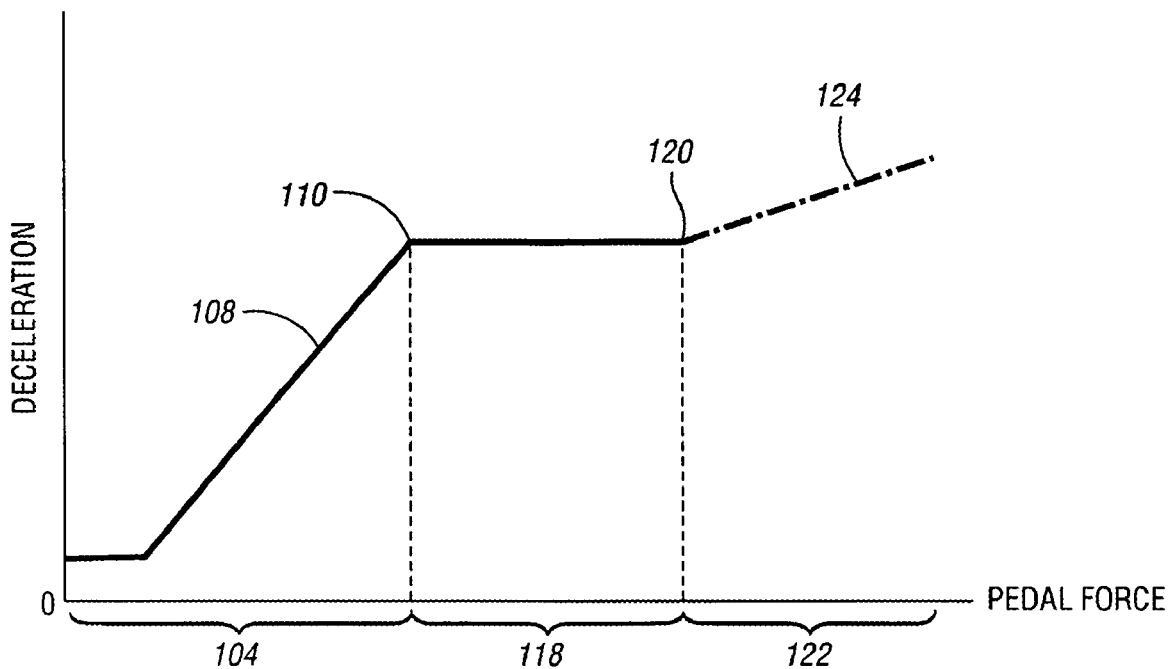
FIG. 5 is a graphical representation similar to FIG. 3, where the brake system is operating such that the vacuum-powered active booster is operating normally and the hydraulic pump has failed or has been degraded.

FIG. 5 is a graphical representation of vehicle deceleration as a function of the muscular force 18 acting on the brake pedal 12 during a second system failure operation. More specifically, the hydraulic pump 78 is in failure, or is severely degraded, and the active booster 44 is fully functional such that the active booster 44 operates solely along the entire range 114 of muscular forces 18. More specifically, at the point 110 of maximum vacuum force, a non-responsive period 118 is present where the pressurized brake fluid 26 is no longer being increased. However, at point 120, the gap push rod 96 abuts the diaphragm 52 and further urges the pistons 62, 64 forward. This period is generally indicated by reference numeral 122. One set of circumstances that may cause this condition is a failure of the hydraulic pump 78 where the electrical power of the active booster 44 is still operational.

Figure 6:
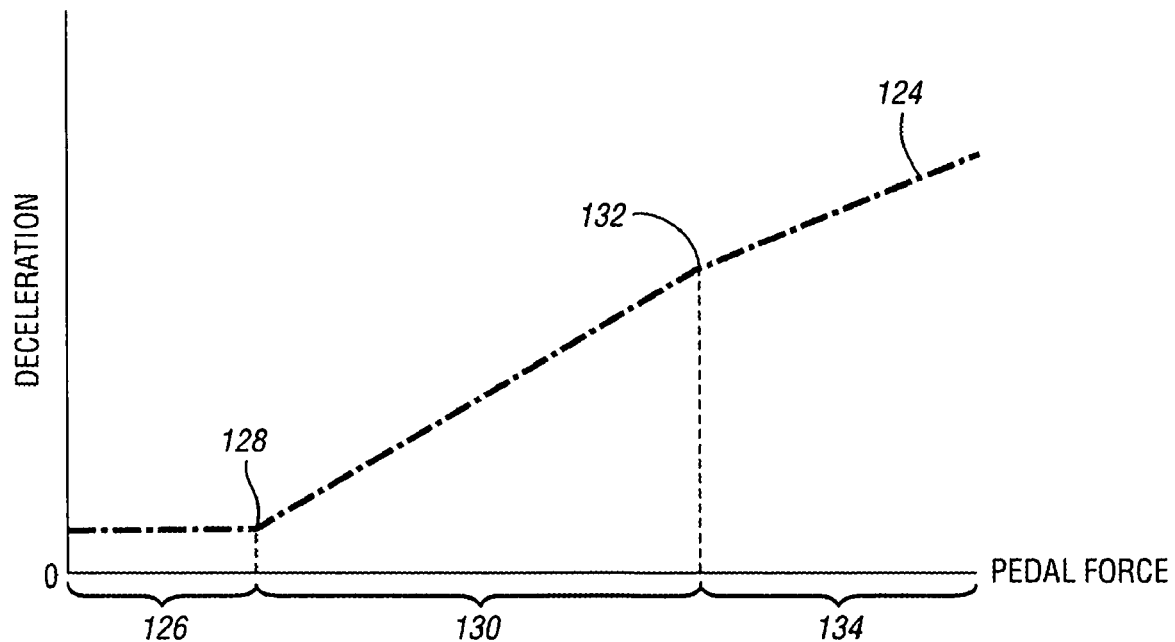
FIG. 6 is a graphical representation similar to FIG. 3, where the brake system is operating such that the vacuum-powered active booster and the hydraulic pump have failed or have been degraded.

FIG. 6 is a graphical representation of vehicle deceleration as a function of the muscular force 18 acting on the brake pedal 12 during a third system failure operation. More specifically, the active booster 44 and the hydraulic pump 78 are in failure, or are severely degraded, but the MCU 94 is still operational such that the gap push rod 96 is the sole means of brake actuation along the entire range of muscular forces 18. More specifically, a non-responsive period 126 is present until a point 128 when the gap push rod 96 engages the diaphragm 52 and actuates the respective wheel brakes 28. The gap push rod 96 is boosted by the mechanically-controlled valve 102 along a period 130 ending at point 132, when the ambient air force is generally equal to the forces of the springs 63, 65. Subsequently, the mechanically-controlled valve 102 continues to actuate the respective wheel brakes 28 along period 134 at a generally constant, decreased rate. One set of circumstances that may cause this condition is complete, system-wide electrical failure.

The foregoing detailed description describes only a few of the many forms that the invention can take and should therefore be taken as illustrative rather than limiting.

We claim:

1. A hydraulic brake system for a motor vehicle providing pressurized brake fluid to a wheel brake in response to a demand signal, the brake system comprising:
    a brake pedal configured to be depressed by a muscle force;
    a master cylinder in working communication with the wheel brake to control a pressure of the pressurized brake fluid;
    a first pressure-amplifying mechanism in working communication with and configured to control the master cylinder in response to a first electrical output signal that is based on the demand signal, the first pressure amplifying mechanism including a vacuum booster having a variable chamber and an electrically controlled valve, the valve being controlled by the first electrical output signal to regulate a fluid connection between the variable chamber and ambient air;
    a second pressure-amplifying mechanism in working communication with the wheel brake to control the pressure of the pressurized brake fluid in response to a second electrical output signal;
    an electronic control unit in electrical communication with the first and the second pressure-amplifying mechanisms to provide the first electrical output signal to the first pressure-amplifying mechanism and to provide the second electrical output signal to the second pressure-amplifying mechanism; and
    a mechanical control unit connected to the brake pedal, the mechanical control unit configured to provide a mechanical signal proportional to the demand signal to the first pressure-amplifying mechanism to control the pressure of the pressurized brake fluid only when at least one of the first and second pressure-amplifying mechanisms fails to increase the pressure of the pressurized brake fluid in correlation with the first electrical output signal, wherein the mechanical control unit mechanically disconnects the brake pedal from the first pressure-amplifying mechanism during normal operating conditions.

2. A hydraulic brake system as in claim 1, wherein the electronic control unit receives an electrical signal proportional to the demand signal and a first input signal, wherein the first and second electrical output signals are based on the demand signal and the first input signal, wherein the demand signal corresponds to a muscle force exerted on a brake pedal by a system user, and wherein the first input signal corresponds to a first pressure of the pressurized brake fluid exiting the master cylinder.

3. A hydraulic brake system as in claim 2, wherein the electronic control unit receives a second input signal, wherein the first and second electrical output signals are based on the demand signal, the first input signal, and the second input signal, wherein the second input signal corresponds to a second pressure of the pressurized brake fluid exiting the second pressure-amplifying mechanism.

4. A hydraulic brake system as in claim 3, further comprising:
    a first pressure sensor configured to measure the first pressure and to provide the electrical control unit with the first input signal; and a second pressure sensor configured to measure the second pressure and to provide the electrical control unit with the second input signal.

5. A hydraulic brake system as in claim 4, further comprising:
a road wheel selectively engaged by the wheel brake; and
a rotational wheel speed sensor measuring a rotational wheel speed of the road wheel and providing a third input signal corresponding to the rotational wheel speed to the electronic control unit, wherein the first and second electrical output signals are based on the demand signal, the first input signal, the second input signal, and the third input signal.

6. A hydraulic brake system as in claim 1, wherein the mechanical control unit includes a push rod configured to engage a secondary activation means in the first pressure-amplifying mechanism to control the pressure of the pressurized brake fluid only when at least one of the first and second pressure-amplifying mechanisms fails to increase the pressure of the pressurized brake fluid in correlation with the first electrical output signal.

7. A hydraulic brake system as in claim 1, further comprising:
a pedal feel simulator mechanically connected to the brake pedal, depression of the brake pedal generating the demand signal wherein the pedal feel simulator generates an electrical signal proportional to the demand signal based on the muscle force and to apply onto the brake pedal a reactionary force simulating a reaction force between the brake pedal and the master cylinder.

8. A hydraulic brake system as in claim 1, wherein the first pressure-amplifying mechanism further includes a vacuum chamber separated from the variable chamber by a diaphragm, and a one-way valve located within the diaphragm to control a fluid connection between the vacuum chamber and the variable chamber.

9. A hydraulic brake system as in claim 1, wherein the second pressure-amplifying mechanism includes a hydraulic pump configured to urge the pressurized brake fluid towards the wheel brake.

10. A hydraulic brake system for a motor vehicle providing pressurized brake fluid to a wheel brake in response to a demand signal, the brake system comprising:
a brake pedal configured to be depressed by a muscular force to generate the demand signal;
a master cylinder in working communication with the wheel brake and configured to control a pressure of the pressurized brake fluid;
a vacuum booster in working communication with and configured to control the master cylinder in correlation with a first electrical output signal, the vacuum booster including a variable chamber and an electrically controlled valve, wherein the valve is configured to control a fluid connection between the variable chamber and ambient air based on the first electrical output signal, the vacuum booster being mechanically disconnected from the brake pedal during normal operating conditions;
a hydraulic pump in working communication with the wheel brake and configured to urge the pressurized brake fluid towards the wheel brake to control the pressure of the pressurized brake fluid in response to a second output signal;
a first pressure sensor fluidly connected to the master cylinder to provide a first input signal corresponding to a first pressure of the pressurized brake fluid exiting the master cylinder;
a second pressure sensor fluidly connected to the hydraulic pump to provide a second input signal corresponding to a second pressure of the pressurized brake fluid exiting the hydraulic pump; and
a control unit in working communication with the first and second pressure sensors to receive the first and second input signals therefrom, the first and second output signals being based on the demand signal, the first input signal, and the second input signal, wherein the control unit is in working communication with the vacuum booster and the hydraulic pump to provide the first output signal to the vacuum booster and to provide the second output signal to the hydraulic pump.

11. A hydraulic brake system as in claim 10, further comprising:
a road wheel selectively engaged by the wheel brake to retard rotation of the road wheel; and
a rotational wheel speed sensor measuring a rotational wheel speed of the road wheel and providing a third input signal to the control unit, wherein the first and second signals are based on the demand signal, the first input signal, the second input signal, and the third input signal.

12. A hydraulic brake system as in claim 10, wherein the demand signal corresponds to the muscle force and further comprising a pedal feel simulator mechanically connected to the brake pedal, the pedal feel simulator configured to generate an electrical signal based on the demand signal, and the pedal feel simulator configured to apply onto the brake pedal a reactionary force simulating a reaction force between the brake pedal and master cylinder.

13. A hydraulic brake system as in claim 10, further comprising a mechanical control unit connected to the brake pedal and configured to provide a mechanical signal to the vacuum booster to increase the pressure of the pressurized brake fluid if at least one of the vacuum booster and the hydraulic pump fails to increase the pressure of the pressurized brake fluid in correlation with the first output signal.

14. A hydraulic brake system as in claim 13, further comprising a push rod connected to the brake pedal that selectively abuts an activation means of the vacuum booster to increase the pressure of the pressurized brake fluid when the at least one of the vacuum booster and the hydraulic pump fails to increase the pressure of the pressurized brake fluid in correlation with the first output signal.

15. A hydraulic brake system as in claim 14, wherein the first control signal causes the activation means to move in unison with the push rod wherein the activation means and the push rod are prevented from abutting each other while the vacuum booster is increasing the pressure of the pressurized brake fluid in correlation with the first control signal.

16. A hydraulic brake system as in claim 10, wherein the first pressure-amplifying mechanism further includes a vacuum chamber separated from the variable chamber by a diaphragm, and a one-way valve located within the diaphragm to control a fluid connection between the vacuum chamber and the variable chamber.

* * * * *